United States Patent
Su et al.

(10) Patent No.: US 9,857,895 B2
(45) Date of Patent: Jan. 2, 2018

(54) TOUCH DISPLAY DEVICE

(71) Applicant: TPK Touch Solutions (Xiamen) Inc., Xiamen (CN)

(72) Inventors: Fu-Yu Su, New Taipei (TW); I-Chung Hsu, Taipei (TW); Liqiang Huang, Xiamen (CN)

( * ) Notice: Subject to any disclaimer, the term of this patent is extended or adjusted under 35 U.S.C. 154(b) by 0 days.

(21) Appl. No.: 14/799,562

(22) Filed: Jul. 14, 2015

(65) Prior Publication Data

US 2016/0018936 A1    Jan. 21, 2016

(30) Foreign Application Priority Data

Jul. 15, 2014    (CN) .......................... 2014 1 0335959

(51) Int. Cl.
*G06F 3/041*    (2006.01)
*G06F 1/16*    (2006.01)

(52) U.S. Cl.
CPC ............ *G06F 3/041* (2013.01); *G06F 1/1626* (2013.01); *G06F 1/1643* (2013.01)

(58) Field of Classification Search
None
See application file for complete search history.

(56) References Cited

U.S. PATENT DOCUMENTS

2009/0284487 A1    11/2009    Nakanishi et al.
2013/0082961 A1*    4/2013    Wang .................... G06F 3/044
                                                              345/173

FOREIGN PATENT DOCUMENTS

| TW | M476993 | 4/2014 |
|---|---|---|
| TW | M478868 | 5/2014 |
| TW | M484742 | 8/2014 |
| TW | M493105 | 1/2015 |
| WO | 2013094476 | 6/2013 |
| WO | 2014097803 | 6/2014 |

* cited by examiner

*Primary Examiner* — Bruce H Hess
*Assistant Examiner* — Sathavaram I Reddy

(57) ABSTRACT

A touch display device includes a transparent substrate, a first ink layer, a shading layer, and a decorative layer. The transparent substrate has a visible region and an non-visible region. The non-visible region is located at the peripheral of the visible region. The first ink layer is disposed on the non-visible region of the transparent substrate. The shading layer is disposed on the first ink layer. The decorative layer is disposed on a portion of the first ink layer and located between the first ink layer and the shading layer. The optical density of the first ink layer is between 0.3 and 0.67.

15 Claims, 3 Drawing Sheets

TOUCH DISPLAY DEVICE

BACKGROUND OF THE INVENTION

This Non-provisional application claims priority under 35 U.S.C. §119(a) to Patent Application No(s). 201410335959.0 filed in People's Republic of China on Jul. 15, 2014 the entire contents of which are hereby incorporated by reference.

Field of the Disclosure

The disclosure relates to touch display devices.

Description of the Related Art

As technology has progressed, various digital devices have been invented, such as mobile phones, tablet computers, ultrabooks, satellite navigation devices, and so on. In addition to general input or manipulation with a keyboard or a mouse, utilizing touch technology to manipulate the digital devices is a quite convenient and popular manipulation method. A touch display panel has a human and intuitive interface for input operation, so that users of any age can directly select or manipulate the digital devices with a finger or a stylus. Therefore, touch input is growing in popularity in the market.

The touch display panel includes a visible region and a non-visible region outside the visible region, and the non-visible region is commonly known as a border. An ink layer is disposed in the non-visible region for hiding some non-transparent electronic components within the touch display panel, so that the touch display panel is relatively aesthetic. Currently, the border of the touch display panel mainly includes black ink, and some hollowed regions are reserved during the formation of the ink to fill with ink of other colors (for example, white or silver) as a function button, a logo, or other icons. However, the color white has simple and pure qualities which are loved by the public, and therefore some borders of the touch display panels are designed to be white.

However, when light colored ink (such as white) is used as the main color of the border, dark colored ink (such as black) is generally used for the function button, logo, or other icons. The two colors form a strong contrast because of their huge difference, which is visually awkward.

SUMMARY OF THE DISCLOSURE

A touch display device according to the disclosure includes a transparent substrate, a first ink layer, a shading layer, and a decorative layer. The transparent substrate has a visible region and an invisible region. The invisible region is located at the peripheral of the visible region. The first ink layer is disposed on the invisible region of the transparent substrate. The shading layer is disposed on the first ink layer. The decorative layer is disposed on a portion of the first ink layer and located between the first ink layer and the shading layer. The optical density of the first ink layer is between 0.3 and 0.67.

In some embodiments, the decorative layer is formed as a logo, a function button icon, or a pattern.

In some embodiments, the thickness of the first ink layer is between 5 µm and 14 µm.

In some embodiments, the touch display device further includes a second ink layer disposed on the first ink layer and located between the first ink layer and the shading layer.

In some embodiments, the second ink layer further covers the decorative layer.

In some embodiments, the color tolerance between the zone of the invisible region having the decorative layer and the zone of the invisible region not having the decorative layer is between 1.3 and 12.

In some embodiments, the shading layer is a black ink, a black photoresist, or a combination thereof.

In some embodiments, the transparent substrate includes a glass substrate, a plastic substrate, a sapphire substrate, or a polarizer.

In some embodiments, the first ink layer is a white ink.

As described above, as to the touch display device according to the disclosure, by means of designing the optical density of the first ink layer, the color of the decorative layer on the invisible region looks relatively gentle through the first ink layer, and thus the overall color presentation of the invisible region is relatively harmonized and consistent.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1A:
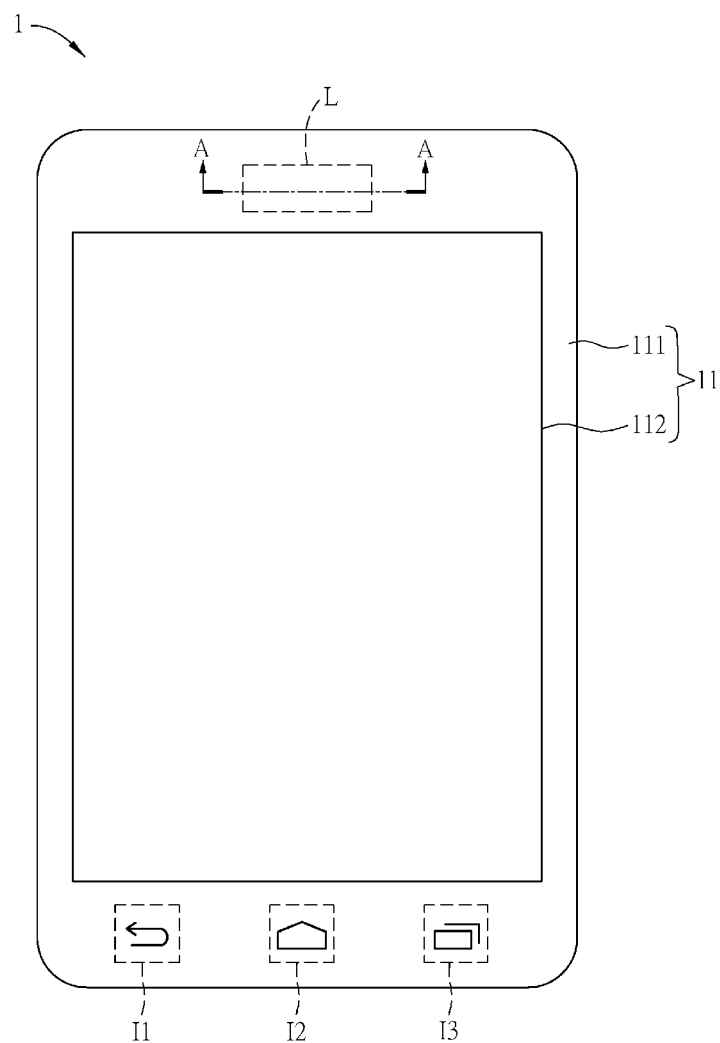
FIG. 1A is a front view of a touch display device in accordance with some embodiments of the disclosure.
Figure 1B:
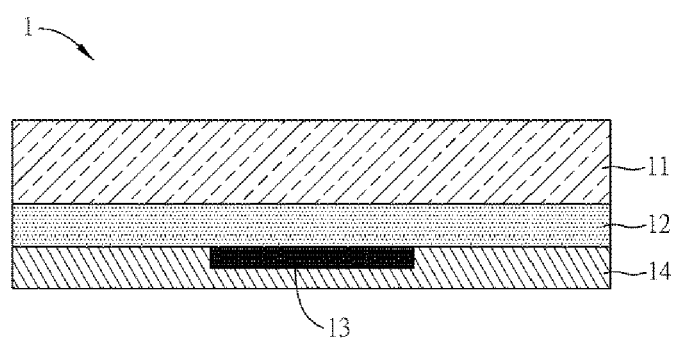
FIG. 1B is a cross-sectional view along the line A-A of FIG. 1A.

FIG. 1A is a front view of a touch display device 1 in accordance with some embodiments of the disclosure, and FIG. 1B is a cross-sectional view along the line A-A of FIG. 1A. Referring to FIG. 1A and FIG. 1B, in some embodiments, the touch display device 1 is, for example but not limited to, a smart phone, a tablet computer, or a wearable device. In some embodiments, the touch display device 1 includes a transparent substrate 11, a first ink layer 12, a decorative layer 13 and a shading layer 14.

The transparent substrate 11 includes a non-visible region 111 and a visible region 112. The transparent substrate 11 may be a glass substrate, a plastic substrate, a sapphire substrate, or a polarizer. The glass substrate is for example in some embodiments, but it is not limited thereto. The visible region 112 is a display region of the touch display device 1, namely a screen of the touch display device 1. The non-visible region 111 is located at the periphery of the visible region 112. Namely, the non-visible region 111 is located on at least one side of the visible region 112. A shielding structure of multiple layers is disposed on the non-visible region 111 to cover wires, a circuit board, or other electronic components thus having an aesthetic function. Here, the first ink layer 12, the decorative layer 13, and the shading layer 14 act as the shielding structure.

The first ink layer 12 is disposed on the non-visible region 111 of the transparent substrate 11, the shading layer 14 is disposed on the first ink layer 12, and the decorative layer 13 is disposed on a portion of the first ink layer 12 and located between the first ink layer 12 and the shading layer 14. In some embodiments, the first ink layer 12 forms a logo, a function button icon, or a pattern (not shown in figures). For example, the logo may be exhibited in the zone L shown in FIG. 1A, and it is generally a logo of a product brand. For example, the function button icon may be exhibited by the zone I1, the zone I2, and the zone I3 shown in FIG. 1A, and it is for example a back button or a home button. The pattern may, for example, be a stripe, a grid and other patterns designed on the non-visible region 111.

Furthermore, the optical density (OD) of the first ink layer 12 is between 0.3 and 0.67. The color of the decorative layer 13 may be revealed through the first ink layer 12 because of the characteristic of lower optical density (i.e. higher light transmittance). For example, the first ink layer 12 is white, and the decorative layer 13 is red. By the design of the optical density described above, a user can still see that the decorative layer 13 is substantially red, but the decorative layer 13 looks pink through the white ink, so that the color of the logo, the function button icon, the pattern, or other regions formed by the decorative layer 13 is relatively gentle, and thus the overall color presentation of the non-visible region 111 is relatively harmonized and consistent. Preferably, the color tolerance between the zone of the non-visible region 111 having the decorative layer 13 and the zone of the non-visible region 111 not having the decorative layer 13 is between 1.3 and 12.

Because the optical density of the first ink layer is relatively low, the light still easily passes through it, so that a user can see the wires, a circuit board, or other electronic components inside the touch display device 1. Therefore, the shading layer 14 uses a material of relatively high optical density. Here, the shading layer 14 may include an ink, a photoresist, or a combination thereof, for example a black ink, a black photoresist, or an overlap of a black ink and a black matrix photoresist, to shield the above elements effectively.

In the manufacturing process, the first ink layer 12 is formed to cover substantially the entirety of the non-visible region 111 of the transparent substrate 11 first, and the manner of formation may be, for example but not limited to, coating, printing, sputtering, and so on. Further, to accord with the range of the optical density of the first ink layer 12, the color or the thickness of the first ink layer 12 can be adjusted. For example, adjust the color of the first ink layer 12 as white, yellow, or other light ink, or set the thickness of the first ink layer 12 as 5 µm to 14 µm to control the optical density of the first ink layer 12 accord with the above range.

Then, the decorative layer 13 is formed on a portion of the first ink layer 12. The decorative layer 13 may be by the mask printing for example. The mask is disposed on the first ink layer 12, and then the ink is printed at the opening of the mask to form a logo, a function button icon, a pattern, or other specific graphics. The shape of the decorative layer 13 is dependent on the shape of the opening.

Last, the non-visible region 111 of the transparent substrate 11 described above, on which the first ink layer 12 and the decorative layer 13 are formed, is covered with the shading layer 14. Preferably, the shading layer 14 covers the total area of the non-visible region 111. Here, the transparent substrate 11 may proceed with following processes, for example the deposition of the touch conductive layer, the connection with the flexible circuit board, or the attachment with the display module.

It should be noted that the first ink layer 12 is a white ink for example, and when the thickness is less than 5 µm, the ink is prone to printing problems such as pinholes, etc. Meanwhile, because the optical density is low and the light transmittance is relatively high, the color of the decorative layer 13 is relatively vivid, and thus the overall color of the non-visible region is not harmonized and consistent as described above. On the other hand, when the thickness is more than 14 µm, the optical density of the first ink layer 12 is high, and the light transmittance is relatively low, so that the decorative layer 13 is shielded by the first ink layer 12, and thus the color of the decorative layer 13 cannot be seen.

Figure 2A:
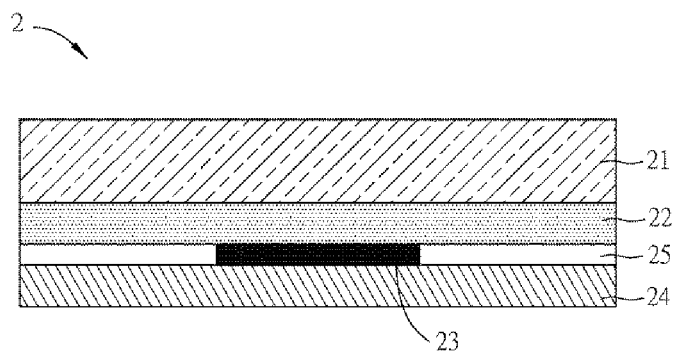
FIG. 2A is a cross-sectional view of a touch display device in accordance with some embodiments of the disclosure.

FIG. 2A is a cross-sectional view of a touch display device 2 in accordance with some embodiments of the disclosure. Referring to FIG. 2A, the touch display device 2 is mostly the same as the touch display device 1 including a transparent substrate 21, a first ink layer 22, a decorative layer 23, and a shading layer 24. Description of the above may refer to the description of FIG. 1A and FIG. 1B. In some embodiments, the touch display device 2 further includes a second ink layer 25 disposed on the first ink layer 22 and located between the first ink layer 22 and the shading layer 24.

In some embodiments, the second ink layer 25 and the decorative layer 23 are located on the same plane, and the thickness of the second ink layer 25 and that of the decorative layer 23 are substantially the same. The disposition of the second ink layer 25 may enhance the optical density of the non-visible region (refer to the non-visible region 111 shown in FIG. 1A). When the color of the second ink layer 25 and that of the first ink layer 22 is the same (such as white), the color density of the first ink layer 22 may be enhanced.

In the manufacturing process, after the first ink layer 22 is formed, the second ink layer 25 may first be formed on the first ink layer 22. Here, the designate zone of forming the graphics of the decorative layer 23 is covered with the mask, the second ink layer 25 is printed or coated on the rest of the non-visible region, and then the decorative layer 23 is formed on a part of the first ink layer 22 which does not have the second ink layer 25. In other words, the decorative layer 23 is formed on the hollowed graphics zone of the second ink layer 25 to form a logo, a function button icon, or a pattern. It is noted that the forming order of the decorative layer 23 and the second ink layer 25 may be exchanged. For example, the decorative layer 23 is firstly formed at the opening of the mask by the mask, namely the logo, the function button icon, or the pattern. Then, the second ink layer 25 is formed on a part of the first ink layer 22 which does not have the decorative layer 23. Although the production of the touch display device 2 of some embodiments is relatively complex and the overall thickness of the touch display device 2 is slightly increased, the second ink layer 25 enhances the optical density of the first ink layer 22 to indeed shield the electronic components.

Figure 2B:
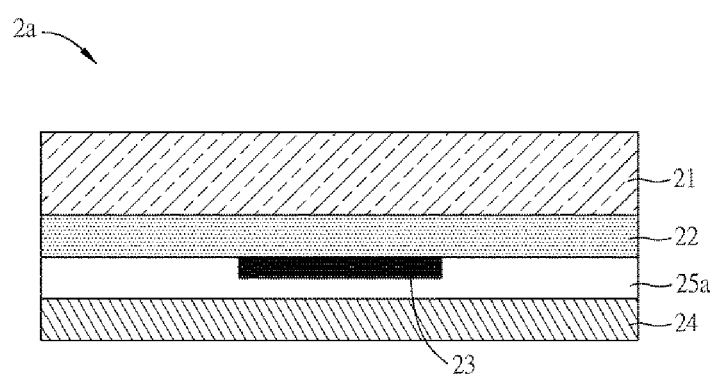
FIG. 2B is a cross-sectional view of another aspect of the touch display device in accordance with some embodiments of the disclosure.

FIG. 2B is a cross-sectional view of another aspect in accordance with some embodiments of the disclosure. Referring to FIG. 2B, in the aspect, the second ink layer 25a of the touch display device 2a further covers the decorative layer 23. That is to say, the second ink layer 25a is disposed on the total area of the non-visible region (refer to the non-visible region 111 shown in FIG. 1A). In the manufacturing process, the second ink layer 25a may be printed or coated on the first ink layer 22 and the decorative layer 23 without the mask. Therefore, it is not necessary to align so as to reduce the tolerance, so the production is relatively simple and convenient.

Furthermore, the color presentation of the decorative layer 23 is only affected by the color and the thickness of the first ink layer 22. That is to say, the color presentation of the decorative layer 23 is unlikely affected by the color and the thickness of the second ink layer 25. More specifically, the color presentation of the decorative layer 23 is determined by the ink color and the thickness between the transparent substrate 21 and the decorative layer 23.

In summary, as to the touch display device according to the disclosure, by means of designing the optical density of the first ink layer, the color of the decorative layer on the non-visible region looks relatively gentle through the first ink layer, and thus the overall color presentation of the non-visible region is relatively harmonized and consistent.

Although the present disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present disclosure.

What is claimed is:

1. A touch display device, comprising:
   a transparent substrate having a visible region and an non-visible region, wherein the non-visible region is located at a peripheral of the visible region;
   a first ink layer disposed on the non-visible region of the transparent substrate;
   a shading layer disposed on the first ink layer;
   a decorative layer disposed between the first ink layer and the shading layer; and
   a second ink layer disposed on the first ink layer and located between the first ink layer and the shading layer, wherein:
   the shading layer underlies the entirety of the decorative layer,
   an optical density of the first ink layer is between 0.3 and 0.67,
   the second ink layer and the decorative layer directly contact the first ink layer, and
   a thickness of the second ink layer is substantially equal to a thickness of the decorative layer.

2. The touch display device of claim 1, wherein the decorative layer forms a logo, a function button icon, or a pattern.

3. The touch display device of claim 1, wherein a thickness of the first ink layer is between 5 μm and 14 μm.

4. The touch display device of claim 1, wherein the second ink layer covers the decorative layer.

5. The touch display device of claim 1, wherein a color tolerance between zones of the non-visible region having the decorative layer and a zone of the non-visible region not having the decorative layer is between 1.3 and 12.

6. The touch display device of claim 1, wherein the shading layer is a black ink, a black photoresist, or a combination thereof.

7. The touch display device of claim 1, wherein the transparent substrate comprises a glass substrate, a plastic substrate, a sapphire substrate, or a polarizer.

8. The touch display device of claim 1, wherein the first ink layer is a white ink.

9. The touch display device of claim 1, wherein the shading layer directly contacts the second ink layer and the decorative layer.

10. The touch display device of claim 1, wherein the second ink layer and the first ink layer are a same color.

11. The touch display device of claim 1, wherein the second ink layer and the first ink layer are white.

12. The touch display device of claim 1, wherein:
   the decorative layer has a top surface, a side surface and a bottom surface,
   the top surface of the decorative layer directly contacts the first ink layer, and
   the side surface of the decorative layer and the bottom surface of the decorative layer directly contact the shading layer.

13. The touch display device of claim 1, wherein:
   the first ink layer and the shading layer underlie an entirety of the non-visible region and
   the decorative layer only underlies a portion of the non-visible region.

14. A touch display device, comprising:
   a transparent substrate having a visible region and an non-visible region, wherein the non-visible region is located at a peripheral of the visible region;
   a first ink layer disposed on the non-visible region of the transparent substrate;
   a shading layer disposed on the first ink layer;
   a decorative layer disposed between the first ink layer and the shading layer; and
   a second ink layer disposed on the first ink layer and located between the first ink layer and the shading layer, wherein:
   the shading layer underlies the entirety of the decorative layer,
   an optical density of the first ink layer is between 0.3 and 0.67,
   the decorative layer has a top surface, a side surface and a bottom surface,
   the top surface of the decorative layer directly contacts the first ink layer,
   the bottom surface of the decorative layer directly contacts the shading layer, and
   the side surface of the decorative layer directly contacts the second ink layer.

15. A touch display device, comprising:
   a transparent substrate having a visible region and an non-visible region, wherein the non-visible region is located at a peripheral of the visible region;
   a first ink layer disposed on the non-visible region of the transparent substrate;
   a shading layer disposed on the first ink layer;
   a decorative layer disposed between the first ink layer and the shading layer; and
   a second ink layer disposed on the first ink layer and located between the first ink layer and the shading layer, wherein:
   the shading layer underlies the entirety of the decorative layer,
   an optical density of the first ink layer is between 0.3 and 0.67,
   the decorative layer has a top surface, a side surface and a bottom surface,
   the top surface of the decorative layer directly contacts the first ink layer,
   the side surface of the decorative layer and the bottom surface of the decorative layer directly contact the second ink layer, and
   the shading layer directly contacts the second ink layer.

* * * * *